(12) United States Patent
Galbiati et al.

(10) Patent No.: US 8,471,505 B2
(45) Date of Patent: Jun. 25, 2013

(54) DEVICE TO SYNCHRONIZE THE CHANGE OF THE DRIVING MODE OF AN ELECTROMAGNETIC LOAD

(75) Inventors: Ezio Galbiati, Agnadello (IT); Roberto Peritore, Gudo Visconti (IT); Michele Bartolini, Melegnano (IT); Agostino Mirabelli, Lomello (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 539 days.

(21) Appl. No.: 12/751,807

(22) Filed: Mar. 31, 2010

(65) Prior Publication Data

US 2010/0244761 A1 Sep. 30, 2010

(30) Foreign Application Priority Data

Mar. 31, 2009 (IT) .............................. MI2009A0507
Nov. 12, 2009 (IT) .............................. MI2009A1987

(51) Int. Cl.
*H02P 6/06* (2006.01)

(52) U.S. Cl.
USPC ...................... 318/400.03; 318/599; 318/811

(58) Field of Classification Search
USPC ..... 318/400.03, 400.29, 811, 599; 360/78.04, 360/78.12, 78.06
See application file for complete search history.

(56) References Cited

U.S. PATENT DOCUMENTS

| 4,658,308 | A | | 4/1987 | Sander, Jr. |
| 4,786,995 | A | | 11/1988 | Stupeck et al. |
| 5,091,680 | A | | 2/1992 | Palm |
| 5,406,150 | A | | 4/1995 | Austin |
| 5,731,670 | A | | 3/1998 | Galbiati et al. |
| 5,798,623 | A | * | 8/1998 | El-Sadi .................... 318/400.17 |
| 6,084,378 | A | * | 7/2000 | Carobolante ................. 318/811 |
| 6,757,129 | B2 | * | 6/2004 | Kuroiwa et al. ........... 360/78.04 |
| 6,975,479 | B2 | * | 12/2005 | Kokami et al. ............ 360/77.02 |
| 7,092,197 | B2 | * | 8/2006 | El-Sherif et al. ................ 360/75 |
| 2005/0218853 | A1 | | 10/2005 | Kokami |
| 2005/0264920 | A1 | | 12/2005 | Ziemer et al. |
| 2008/0303458 | A1 | | 12/2008 | Galbiati |

FOREIGN PATENT DOCUMENTS

JP 2007295643 A 11/2007

* cited by examiner

*Primary Examiner* — Rina Duda
(74) *Attorney, Agent, or Firm* — Seed IP Law Group PLLC

(57) ABSTRACT

A device for the change of the driving mode of an electromagnetic load from a first operating mode with pulse width modulation to a second operating mode that is linear by means of switching circuits. During a first operating mode, each of two outputs has a voltage value ranging from a first reference voltage to a second reference voltage. The device adapted to synchronize a change command signal from a first operating mode to a second operating mode of the electromagnetic load with the signal representative of the flow of current circulating within the load at substantially its average value and adapted to generate a first command signal in response to the synchronization.

29 Claims, 12 Drawing Sheets

DEVICE TO SYNCHRONIZE THE CHANGE OF THE DRIVING MODE OF AN ELECTROMAGNETIC LOAD

BACKGROUND

1. Technical Field

The present disclosure relates to a device to synchronize the change of the driving modality of an electromagnetic load, especially a voice coil motor used in applications for computer hard disks.

2. Description of the Related Art

In the state of the art, it is known that the reading and writing heads of a hard disk for computers are moved by a voice coil motor.

The linear modality current control of a voice coil motor in hard disk applications is accomplished by means of a power stage in a bridge configuration operating in class AB for the known properties of good linearity and cross distortion.

In order to limit the power dissipated by the output stage, during the track search operations, systems of PWM current control are used.

A method to PWM drive a power stage in a bridge configuration is described in Patent EP 760552. FIG. 1 shows the diagram of a power stage 1 with driving circuits 2 and voice coil motor 3 as described in the aforementioned patent. Power stage 1 comprises two half-bridges of transistors M1-M2 and M3-M4 arranged between voltage VM and mass GND and controlled by driving circuits 2; the voice coil motor is coupled between the shared terminal of the transistor bridges and is therefore driven through the outputs VCM_+ and VCM_−. Each driving circuit 2 is adapted to drive the corresponding output VCM_+ and VCM_− by means of a pulse width-modulated signal obtained by means of comparators adapted to compare the two 180° phase-shifted triangular voltages Tri and Tri180, produced by means of appropriate oscillators, for example, with a signal Eout. The signal Eout is produced by an error amplifier 4 having a signal Vref on the non-inverting input terminal and a signal existing on the inverting input terminal and corresponding to the difference between the current Ivcm flowing on the voice coil motor 3, detected by a resistance Rs and an appropriate amplifier Gs, and an external signal Dout. The signal Dout corresponds to the desired current value on the outputs VCM_+ and VCM_−. Specifically, the signal Eout corresponds to the difference between the detected current and the signal Dout.

The peculiarity of this system is that the current in the load is controlled by varying the duty cycle of the two outputs VCM_+ and VCM_− of stage power 1; the null current condition is obtained by driving the two outputs with two signals having the same frequency and 50% duty cycle. By increasing the duty cycle of the output VCM_+ and decreasing the duty cycle of the output VCM_−, or vice versa, the result is that the current will pass through the load with direction and intensity depending on the difference in duty cycle between the two outputs.

FIG. 2 shows the timing diagrams of the signals Tri, Tri180, Eout, VCM_+, VCM_−, Ivcm and the pulse signals Tri-Peak and Tri-Mid which show the (positive and negative) voltage peak Tri and the crossing point between the voltages Tri180 and Tri, respectively; the signals describe the operation of the current control in case of positive current in accordance with the apparatus in FIG. 1.

This method results in a reduction of the power dissipated by the power stage by means of the change of operation modality of the power stage from linear to PWM which occurs by means of an external signal L/P sent to the driving circuits 2.

If the voice coil motor 3 is controlled so that the reading and writing head moved by the same follows a track and allows to read and/or write data on the disk ("tracking mode"), the current required for this operation is of a low value, and power stage 1 is therefore controlled in linear modality.

If the reading and writing head moved by the voice coil motor 3 should operate a track skip to read new data ("seeking mode"), the current required to rapidly accelerate and brake is of a far higher level than in the case of the tracking mode. Therefore, in order to increase the efficiency of the system and decrease the power dissipated by the output stage during the track skip or seeking, the voice coil motor 3 is controlled in PWM modality to then return to linear modality at the end of the decelerating step, where the heads reach the track to be read and the current to be controlled is of a low value.

In FIG. 3 there is depicted a typical profile of the current Ivcm in the voice coil motor 3 during a seeking operation in accordance with the known art: the current to be controlled is of a high value in order to rapidly accelerate and decelerate, and the current control operates in PWM modality in order to decrease the power dissipated by the output stage.

Once the heads are close to the track on which the data are read or written, both the speed of the motor and the current controlled therein are of a low value, whereby the operation modality is changed into linear modality LIN by means of the signal L/P.

It is therefore apparent that there is a transition from one operation modality to another at the end of the seeking step.

FIG. 4 shows the voltages VCM_+, VCM_−, the current Ivcm and the signal Eout during the transition from the current control in pulse width modality (PWM) to the control in linear modality LIN in the control apparatus in FIG. 1. Upon the transition, the current Ivcm in the voice coil motor 3 has a hole or glitch due to the adjustment time needed by the control apparatus during the transition from the modality PWM to the linear modality LIN.

FIG. 5 shows the signals in FIG. 4 in more detail.

In both of the operation modalities, the mean value of the controlled current is the same. When operating in modality PWM, the current Ivcm is characterized by a ripple which is a function of the frequency of signal PWM and by the features of inductance and resistance of the voice coil motor 3. The modality change from PWM to LIN takes place asynchronously as compared to the PWM frequency at which the power stage 1 is operating. Therefore it may happen at any time during the period of the ripple of the current Icvm in the voice coil motor 3. In the specific case of FIG. 5, the change of the operation modality takes place exactly at the end of a recirculating step, where the current is at its minimum value. Under these conditions, the current glitch due to the adjustment time required for the modality change from PWM to LIN is emphasized. This current glitch is a discontinuity existing in the power-assisted control system which places the heads on the disk tracks and which is moved by the voice coil motor 3, and may deteriorate the system performance in terms of accuracy and arrival time on the tracks.

BRIEF SUMMARY

In view of the state of the art, the present disclosure provides a device to synchronize the change of the driving modality of an electromagnetic load that minimizes the time required to change the driving modality and, specifically, limits the variation of the mean value of the current in the voice coil motor during the change of the driving modality, if the electromagnetic load is a voice coil motor.

In accordance with the present disclosure, a device is provided to synchronize the change of driving modality of an electromagnetic load, the electromagnetic load being passed through by a current, and having at the input a control signal to change the operation modality of an electromagnetic load from a first operation modality to a second operation modality or vice versa, and a signal representative of the passage of current passing through the load for substantially its mean value, the device including a circuit adapted to synchronize the control signal of the change from the first operation modality to the second operation modality or vice versa of the electromagnetic load with the signal representative of the passage of the current passing through the load for substantially its mean value and to generate a control signal as a function of the synchronization.

In accordance with the present disclosure, a device is provided for the change of the driving mode of an electromagnetic load from a first pulse width modulation operating mode to a second operating mode by means of a couple of switching circuits, the electromagnetic load being crossed by a current, the terminals of the electromagnetic load being coupled to the respective outputs of the couple of switching circuits, each of the two outputs during the first operating mode having a voltage value ranging from a first reference voltage to a second reference voltage, with the second reference voltage being higher than the first reference voltage, the device having an input command signal of the change of the operating mode of the electromagnetic load from the first operating mode to the second operating mode and a signal representative of the flow of current circulating within the load at substantially its average value. The device includes a first circuit adapted to synchronize the command signal of the change from the first operating mode to the second operating mode of the electromagnetic load with the signal representative of the flow of current circulating within the load at substantially its average value and adapted to generate a first command signal in response to the synchronization, the first circuit adapted to command the load driving with the first operating mode in response to the first command signal, and further comprising a second circuit adapted to command the change from the first operating mode to the second operating mode of the electromagnetic load when at least one voltage on one of the two outputs of the two switching circuits reaches a value that is substantially equal to half the difference between the second reference voltage and the first reference voltage.

In accordance with another aspect of the present disclosure, a control apparatus of an electromagnetic load is provided, the control apparatus including a driving circuit to drive the electromagnetic load passed through by an electric current, the driving circuit adapted to change the operation modality of the electromagnetic load from a first to a second modality or vice versa as a function of an external control signal to change the operation modality of the electromagnetic load, and a device to synchronize the change of the driving modality of an electromagnetic load that comprises a circuit adapted to synchronize the driving signal for changing the first operation modality to the second operation modality or vice versa of the electromagnetic load with the signal representative of the passage of current passing through the load for substantially its average value and to generate a driving signal as a function of the synchronization.

In accordance with another aspect of the present disclosure, a circuit is provided for an electromagnetic load having a first operating mode with pulse width modulation and a second operating mode, the circuit including at least two switching circuits, the electromagnetic load crossed by a current, the terminals of the electromagnetic load being coupled to the respective outputs of the at least two switching circuits, during the first operating mode, each of the two outputs having a voltage value ranging from a first reference voltage to a second reference voltage, with the second reference voltage being higher than the first reference voltage, the device having an input command signal of the change of operating mode of the electromagnetic load from the first operating mode to the second operating mode, and a signal representative of the flow of current circulating within the load at substantially its average value, the circuit further comprising a device to change the driving mode of the load, the device comprising a first circuit adapted to synchronize the change command signal from the first operating mode to the second operating mode of the electromagnetic load with the signal representative of the flow of current circulating within the load at substantially its average value, and adapted to generate a first command signal in response to the synchronization wherein the first circuit is adapted to command the load driving by the first operating mode in response to the first command signal, and the device comprising a second circuit adapted to command the change from the first operating mode to the second operating mode of the electromagnetic load when at least a voltage upon one of the two outputs of the two switching circuits reaches a value that is substantially equal to half the difference between the second reference voltage and the first reference voltage.

In accordance with another aspect of the present disclosure, a control apparatus of an electromagnetic load is provided, the apparatus including a circuit to drive the electromagnetic load covered by an electric current, the driving circuit adapted to change the operating mode of the electromagnetic load from a first mode to a second mode in response to an external command signal of the change of the operating mode of the electromagnetic load, the apparatus comprising a device for controlling the change of driving mode of an electromagnetic load, the device comprising a circuit adapted to synchronize the driving signal for changing the first operation modality to the second operation modality or vice versa of the electromagnetic load with the signal representative of the passage of current passing through the load for substantially its average value and to generate a driving signal as a function of the synchronization.

In accordance with still yet a further aspect of the present disclosure, a method is provided to control the change of driving mode of an electromagnetic load from a first operating mode with pulse width modulation to a second operating mode by means of a plurality of switching circuits, the electromagnetic load crossed by a current, the terminals of the electromagnetic load coupled to the respective outputs of the plurality of switching circuits, during the first operating mode, each of the two outputs having a voltage value ranging from a first reference voltage to a second reference voltage, with the second reference voltage being higher than the first reference voltage, the method including the steps of synchronizing a command signal of the change of operating mode of an electromagnetic load from the first operating mode to the second operating mode and a signal representative of the flow of current circulating within the load at substantially its average value so as to generate a command signal as a function of the synchronization, driving the load by the first operating mode in response to the first command signal, and commanding the change from the first operating mode to the second operating mode of the electromagnetic load when at least one voltage on either one of the two outputs of the two switching circuits reaches a value that is substantially equal to half the difference between the second reference voltage and the first reference voltage.

BRIEF DESCRIPTION OF THE SEVERAL VIEWS OF THE DRAWINGS

The features and advantages of the present disclosure will become apparent from the following detailed description of a practical embodiment thereof, illustrated by way of non-limitative example in the accompanying drawings, in which.

DETAILED DESCRIPTION

Figure 6:
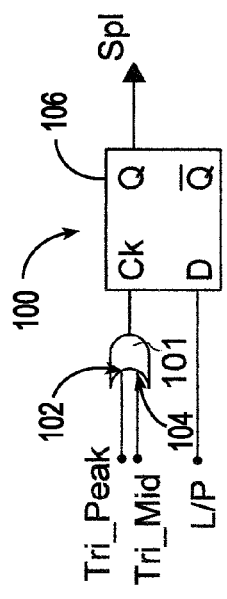
FIG. 6 shows the device to synchronize the change of driving modality of an electromagnetic load in accordance with the present disclosure.

FIG. 6 shows a device 100 to synchronize the change of driving modality of an electromagnetic load 3 in accordance with one aspect of the present disclosure.

The device 100 has a gate device, in this case an OR gate 101 with a first input 102 that receives a control signal L/P to change the operation modality of an electromagnetic load 3 passed through by a current Ivcm from a first operation modality to a second operation modality or vice versa, and a second input 104 to receive a signal Tri_Peak, Tri_Mid representative of the passage of the current Ivcm passing through the load 3 for substantially its mean value IM. The device 100 includes a logic circuit 106 adapted to synchronize the control signal L/P for changing from the first operation modality to the second operation modality or vice versa of the electromagnetic load with the signal representative of the passage of the current Ivcm passing through the load 3 for substantially its mean value IM. The circuit 106 is adapted to generate a control signal Spl as a function of the synchronization.

Specifically, the first operation modality is the pulse width modulation (PWM) modality.

Figure 1:
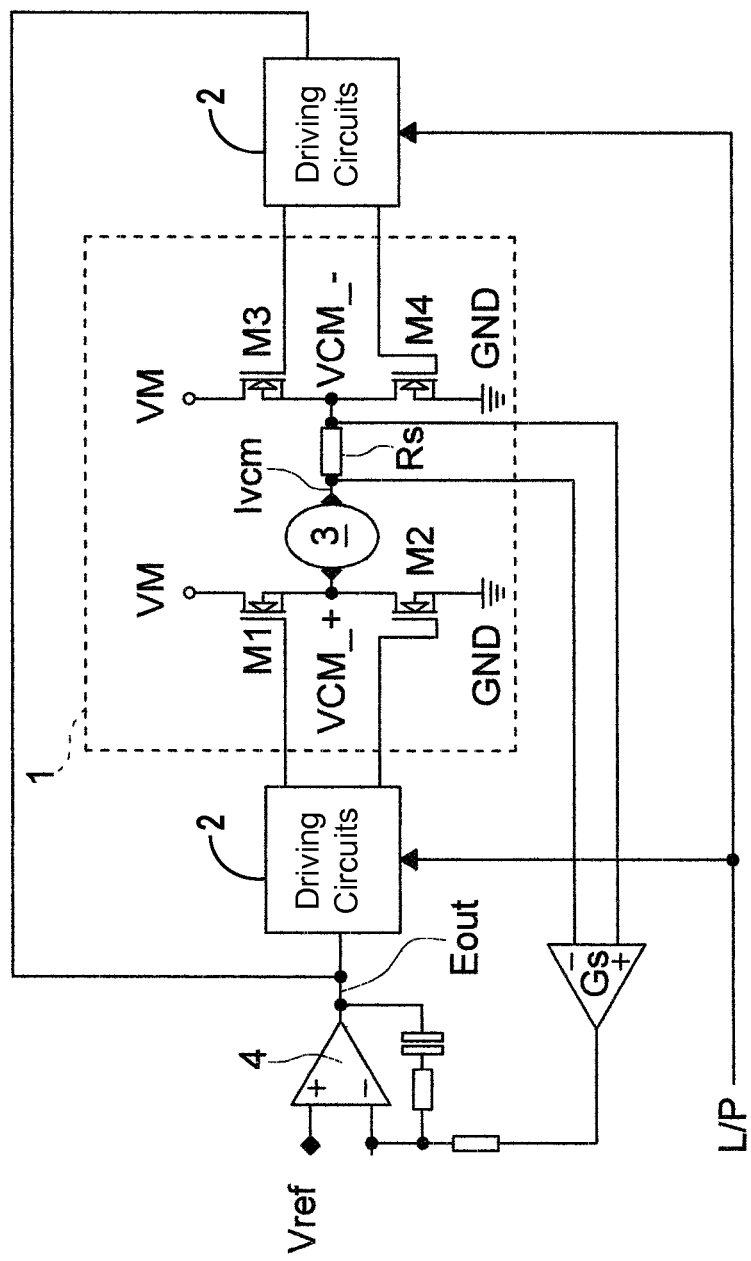
FIG. 1 shows a control apparatus of a voice coil motor in accordance with the known art.
Figure 2:
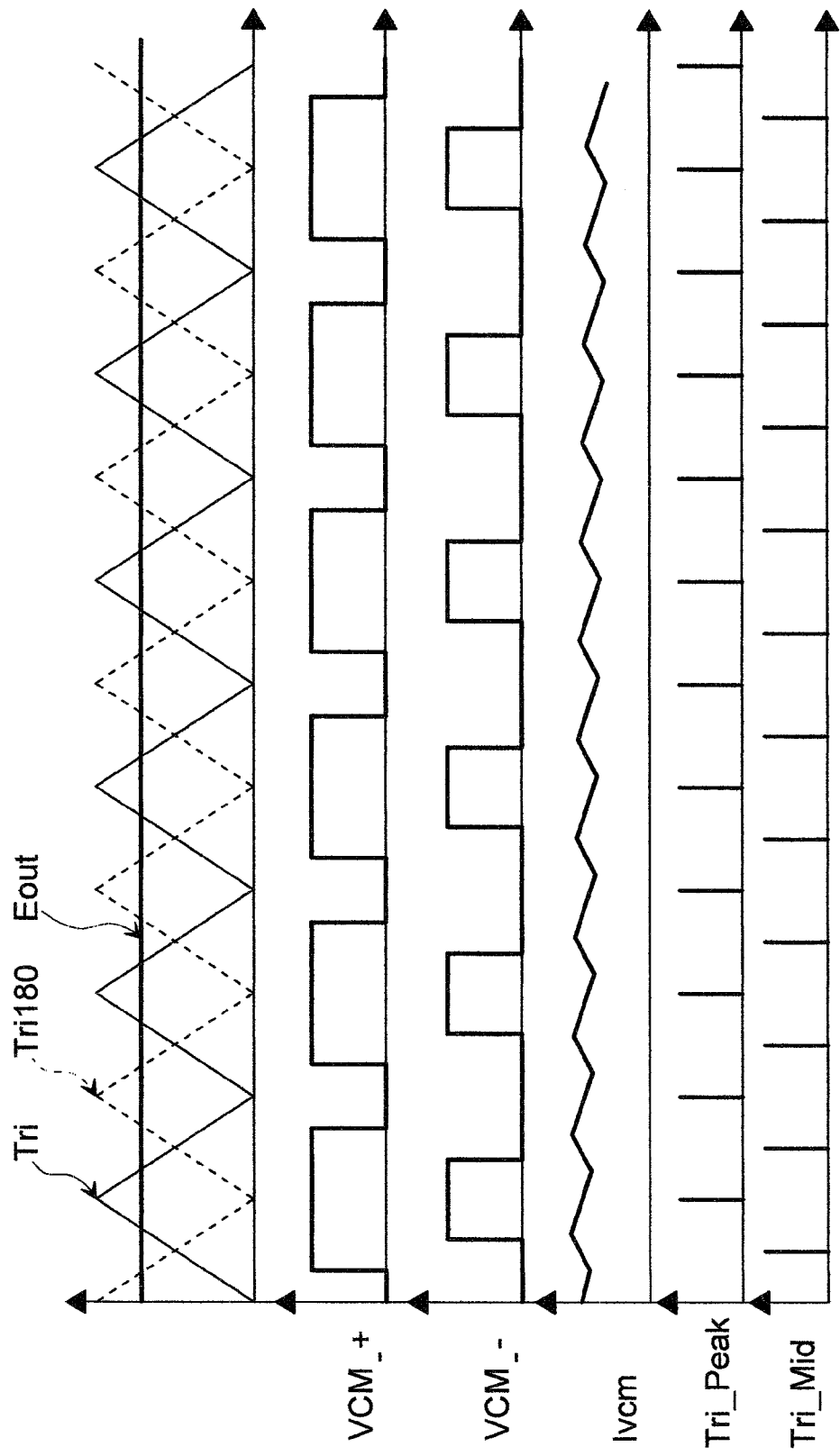
FIG. 2 shows time diagrams of involved signals for the apparatus in FIG. 1.
Figure 3:
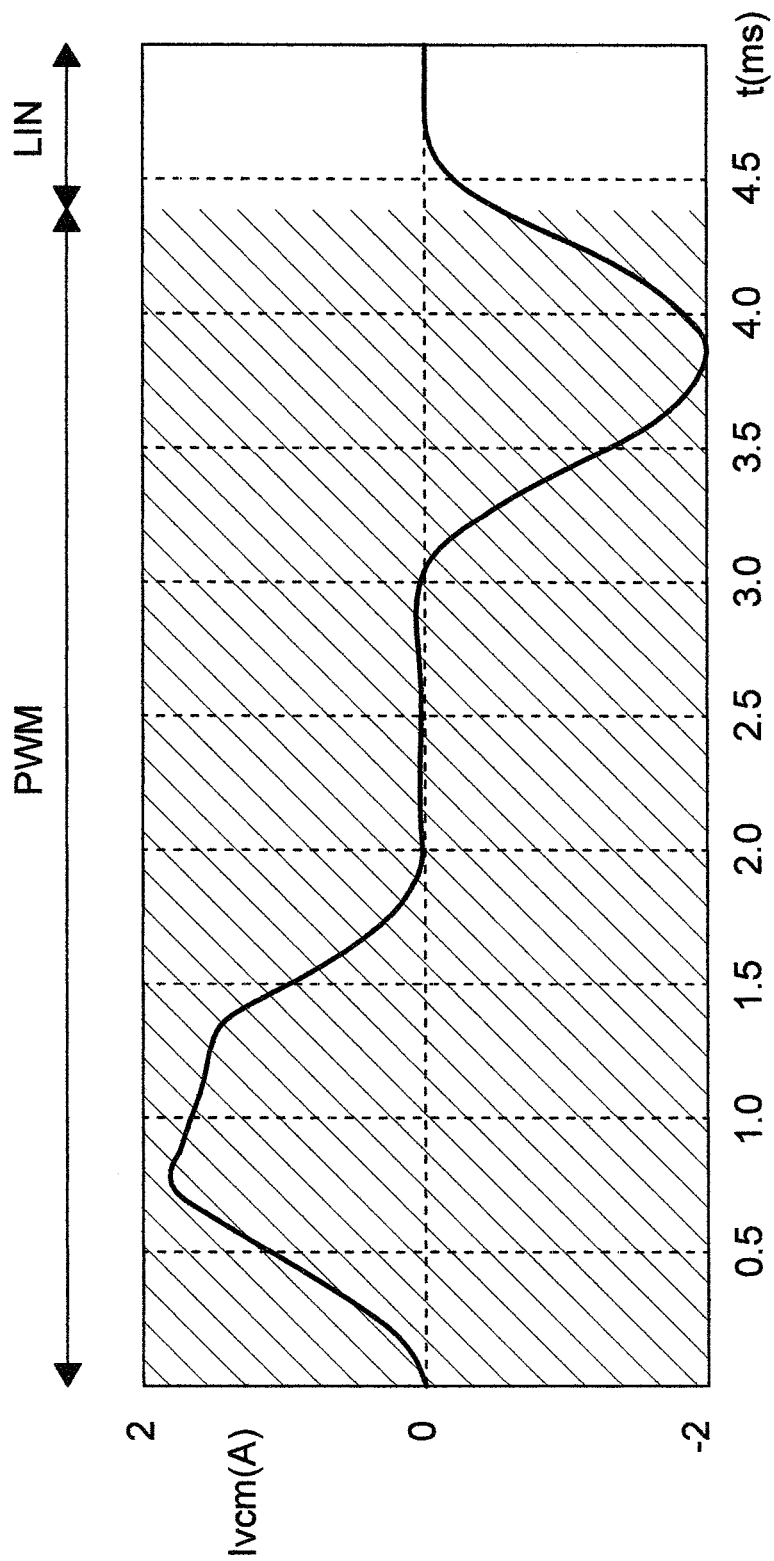
FIG. 3 shows the time trend of the current of a voice coil motor driven by the circuit in FIG. 1 during a seeking operation.
Figure 4:
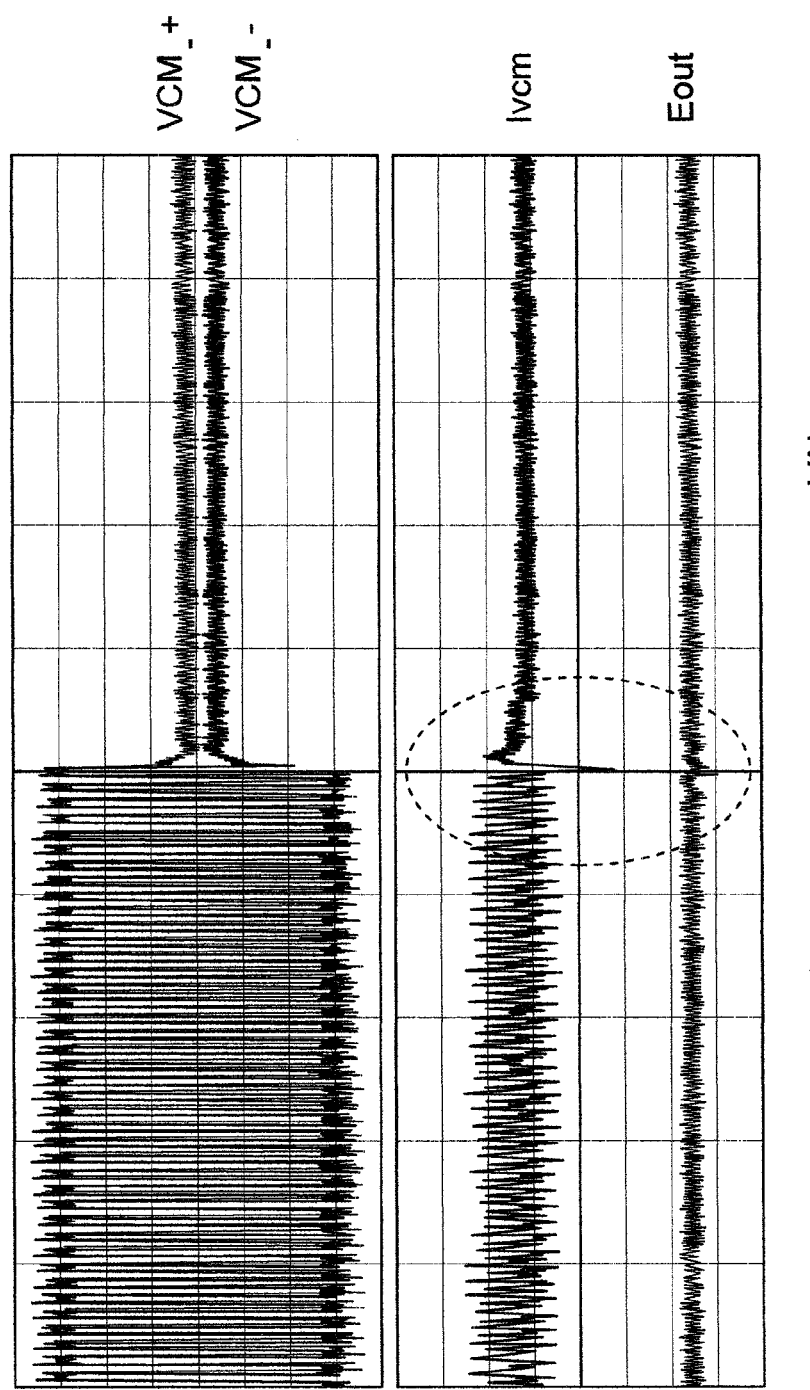
FIG. 4 shows time diagrams of voltages VCM_+, VCM_−, current Ivcm and signal Eout during the transition from the current control in pulse width modality (PWM) to the control in linear modality operated by the apparatus in FIG. 1.
Figure 5:
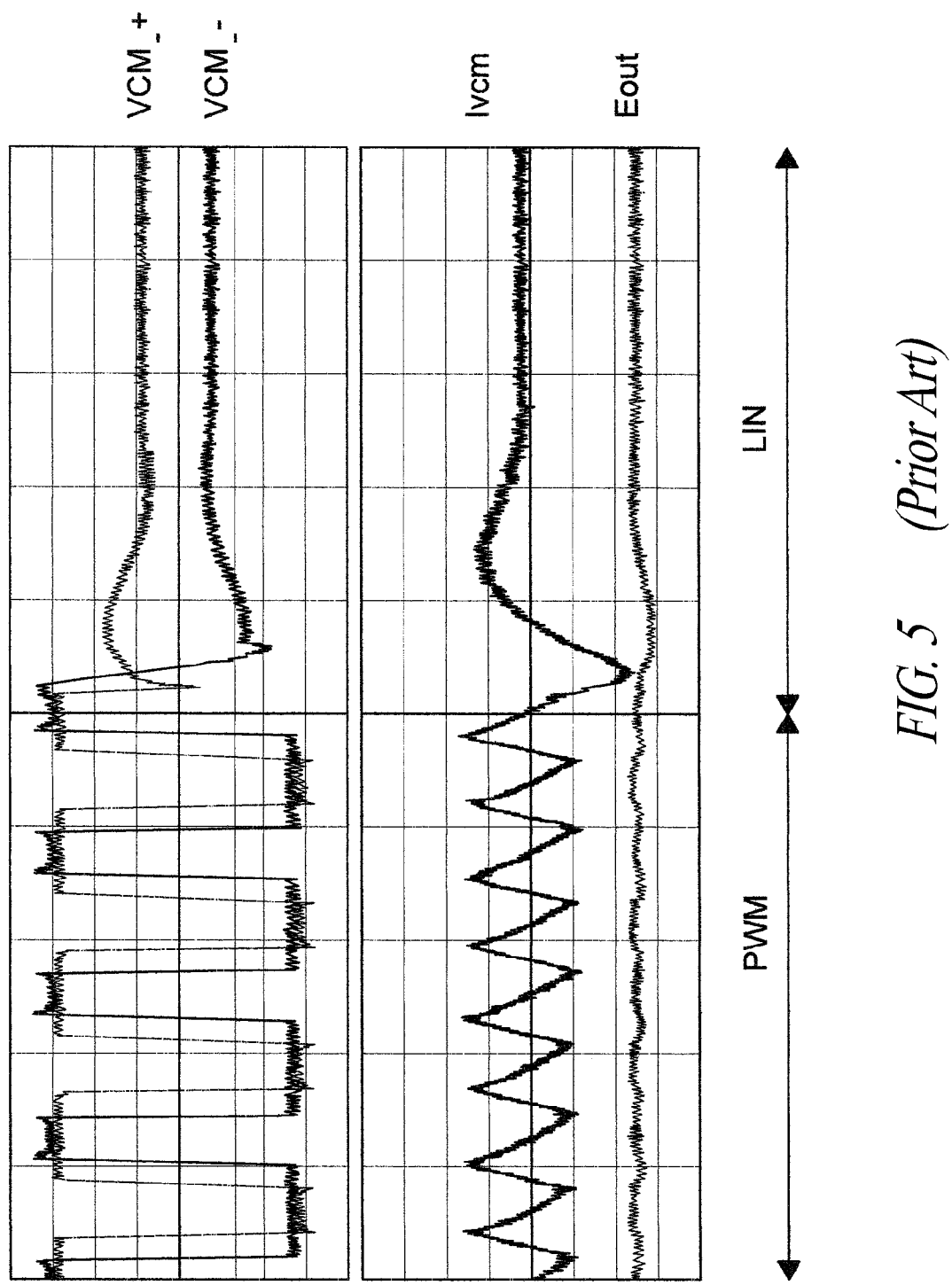
FIG. 5 shows the signals of FIG. 4 in more detail.

The synchronization takes place with the passage of the current Ivcm for the mean value IM of the current passing through the electromagnetic load so that, if the electromagnetic load is the voice coil motor 3 in FIG. 1 and the driving apparatus is that in FIG. 1, the passage of the current Ivcm for the mean value IM coincides with the either positive or negative peak, or the mean value of the triangular voltage used to generate the PWM signals VCM_+ and VCM_−; therefore, there is either the signal Tri_Peak or the signal Tri_Mid at the input of the circuit 106.

Figure 7:
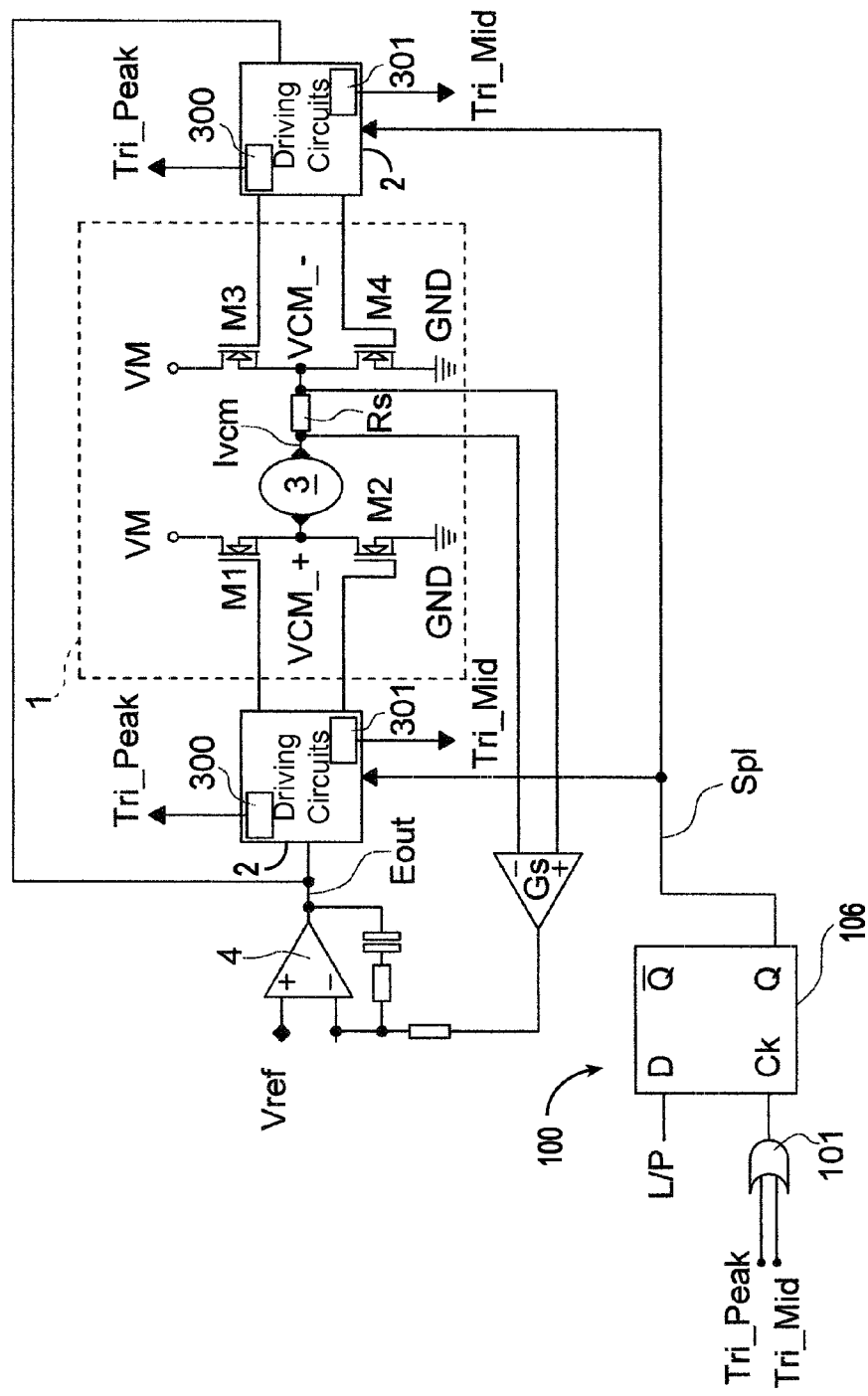
FIG. 7 shows the control apparatus in FIG. 1 to which the device in FIG. 6 is added.

The device in accordance with the disclosure may thus be specifically applied to the apparatus for controlling a voice coil motor 3 as that in FIG. 1, already described and known from Patent EP 760552, thus obtaining the control apparatus in FIG. 7; in such a case, the device 100 allows the synchronization to change the operation modality from PWM to linear LIN. The device 100 has at the input the control to change the modality L/P and the signal Tri_Peak or the signal Tri_Mid, i.e., the pulse signal representing the peaks of triangular waveform Tri or triangular waveform Tri180, 180° phase-shifted with respect to the triangular waveform Tri, or the pulse signal representing the mean value of the triangular waveform Tri or triangular waveform Tri180; the Tri_Peak and Tri_Mid signals are detected by suitable means 300 and 301 internal to the driving circuits 2 or external thereto but still belonging to the control apparatus and already known. The output of the device 100 is a signal Spl, which synchronizes the signal L/P with the peak or the mean value of the triangular waveform Tri or Tri180. Therefore, there is a synchronization with the frequency of the PWM voltage at which the power stage 1 is operating. Even more specifically, means 301 detect the signal Tri_Mid at every crossing of the triangular waveforms Tri and Tri180.

In fact, when operating in PWM modality, the current Ivcm presents a ripple overlapping the mean value: the current Ivcm of the voice coil motor 3 crosses the mean value IM halfway through the conducting step, when the two outputs VCM_+ and VCM_− have a different potential, and halfway through the recirculating step, when the two outputs VCM_+ and VCM_− have an equal (low or high) potential.

These two instants coincide with the peaks of the triangular waves and with the crossing between the two triangular Tri and Tri180 used to generate the PWM signals VCM_+ and VCM_− by comparison with the output Eout of the error amplifier 4.

Within the control apparatus, there are two pulse signals Tri_Peak and Tri_Mid, precisely indicating the passage of the triangular waveforms 180° phase-shifted from these two points.

By means of the device 100 in FIG. 6, the change of modality from PWM to linear LIN may be synchronized with the PWM frequency at which the power stage 1 is operating. Specifically, the device 100 is implemented with a flip-flop 106. The asynchronous control L/P defining the operation modality is sent to the input D of the flip-flop 106; the clock Ck of this flip-flop 106 is represented by the output signal from an OR gate 101 having at the input the two signals Tri_Peak and Tri_Mid which are synchronous with the peaks of the triangular and with the crossing thereof or the mean value thereof. The flip-flop 106 has two outputs Q and denied Q, with the output Q being coinciding with the output Spl.

Specifically, the PWM modality is selected when the signal L/P is at a high-level, whereas the linear modality is selected when it is at a low level or vice versa.

Thereby, the output of the flip-flop 106 generates a signal Spl that drives the transition of the operation modality from PWM to linear at the instants where the ripple of the current of the voice coil motor is close to the mean value of the controlled current.

Figure 8:
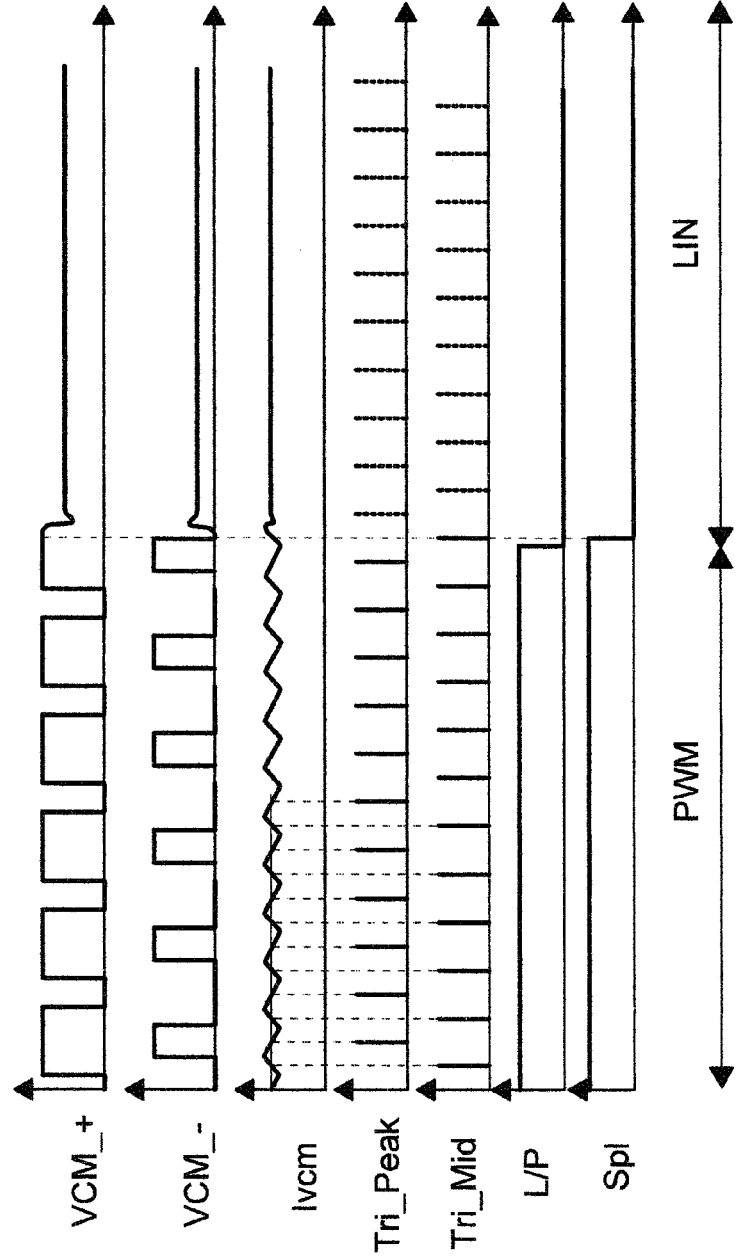
FIG. 8 shows time diagrams of involved signals in a control apparatus of a voice coil motor in which the device according to the disclosure has been added.

FIG. 8 shows time diagrams of signals involved in the control apparatus of the voice coil motor 3 in FIG. 7.

The asynchronous control L/P takes place precisely when the ripple of the current Ivcm is at its minimum level at the end of a recirculating step with both the two outputs VCM_+ and VCM_− being at a high level.

Under these conditions, the real transition is delayed halfway of the subsequent conducting step (high VCM_+ and low VCM_−), when the ripple of the current Ivcm is close to the mean value, and is virtually controlled by the signal Spl.

If the asynchronous control L/P should take place at any other instant during the period of the ripple of the current Ivcm, the real transition would always take place synchronously with the passage of the ripple of the current Ivcm for the mean value IM halfway of a conducting step or halfway of a recirculating step, according to which of these two is the first to appear after the signal L/P has changed its state (from high to low).

Figure 9:
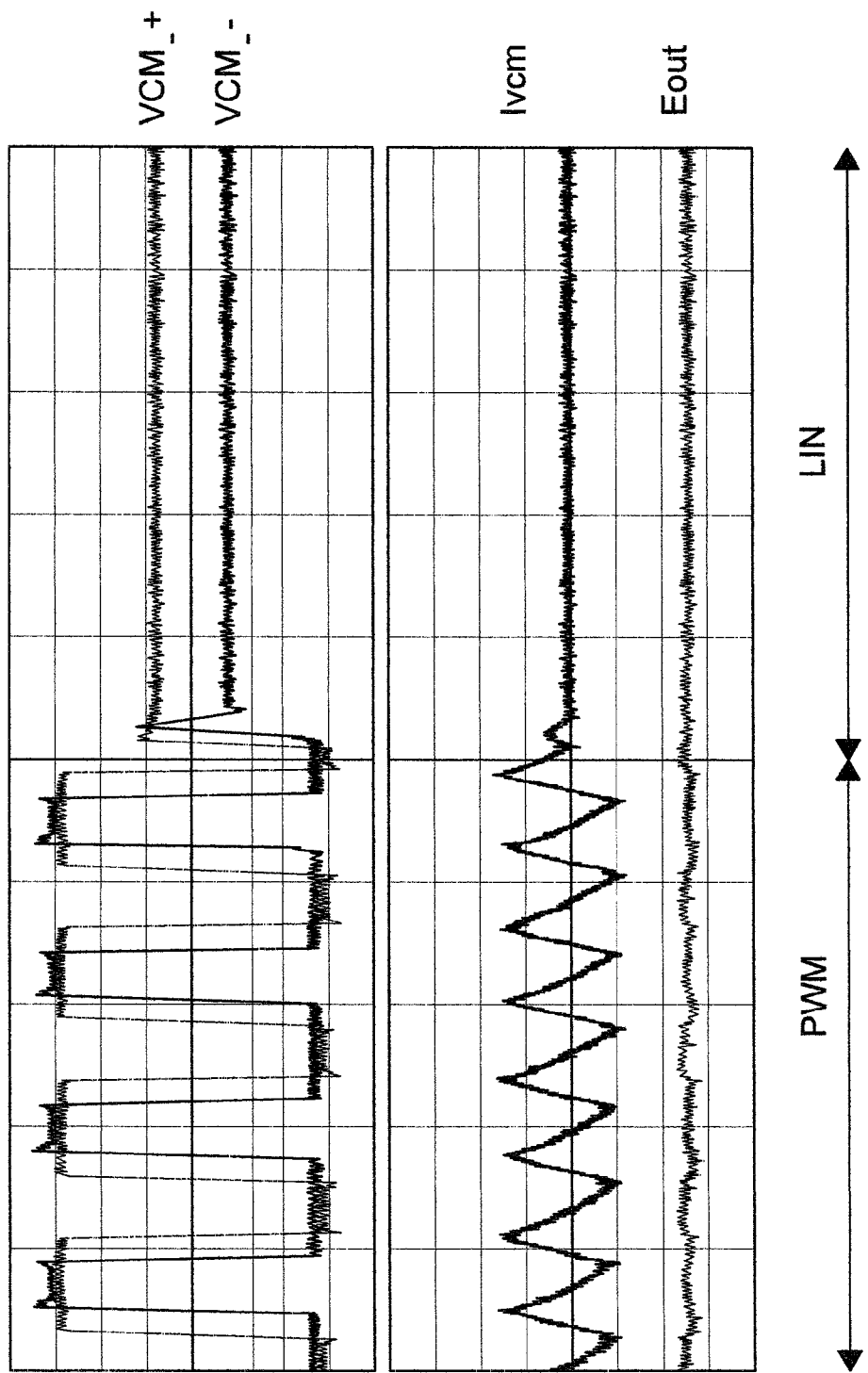
FIG. 9 shows time diagrams of voltages VCM_+, VCM_−, current Ivcm and signal Eout during the transition from the current control in pulse width modality (PWM) to the control in linear modality operated by the control apparatus in FIG. 7.

FIG. 9 shows time diagrams of voltages VCM_+, VCM_−, current Ivcm and signal Eout during the transition from the current control in pulse width modality (PWM) to the control in linear modality operated by the control apparatus in FIG. 7. The change of operation modality from PWM to linear LIN takes place exactly halfway of a recirculating step, with VCM_+ and VCM_ being at a low level, where the current Ivcm is close or equal to the mean value IM.

It is noted that the discontinuity on the value of the controlled current is limited and there is no presence of any hole of current (glitch).

Thereby, the small glitch caused by changing the current control modality minimally disturbs the power-assisted control system which places the heads on the disk tracks and is moved by the voice coil motor 3.

The device in accordance with the disclosure and the apparatus in FIG. 7 are also valid to change the operation modality from linear to PWM.

Figure 10:
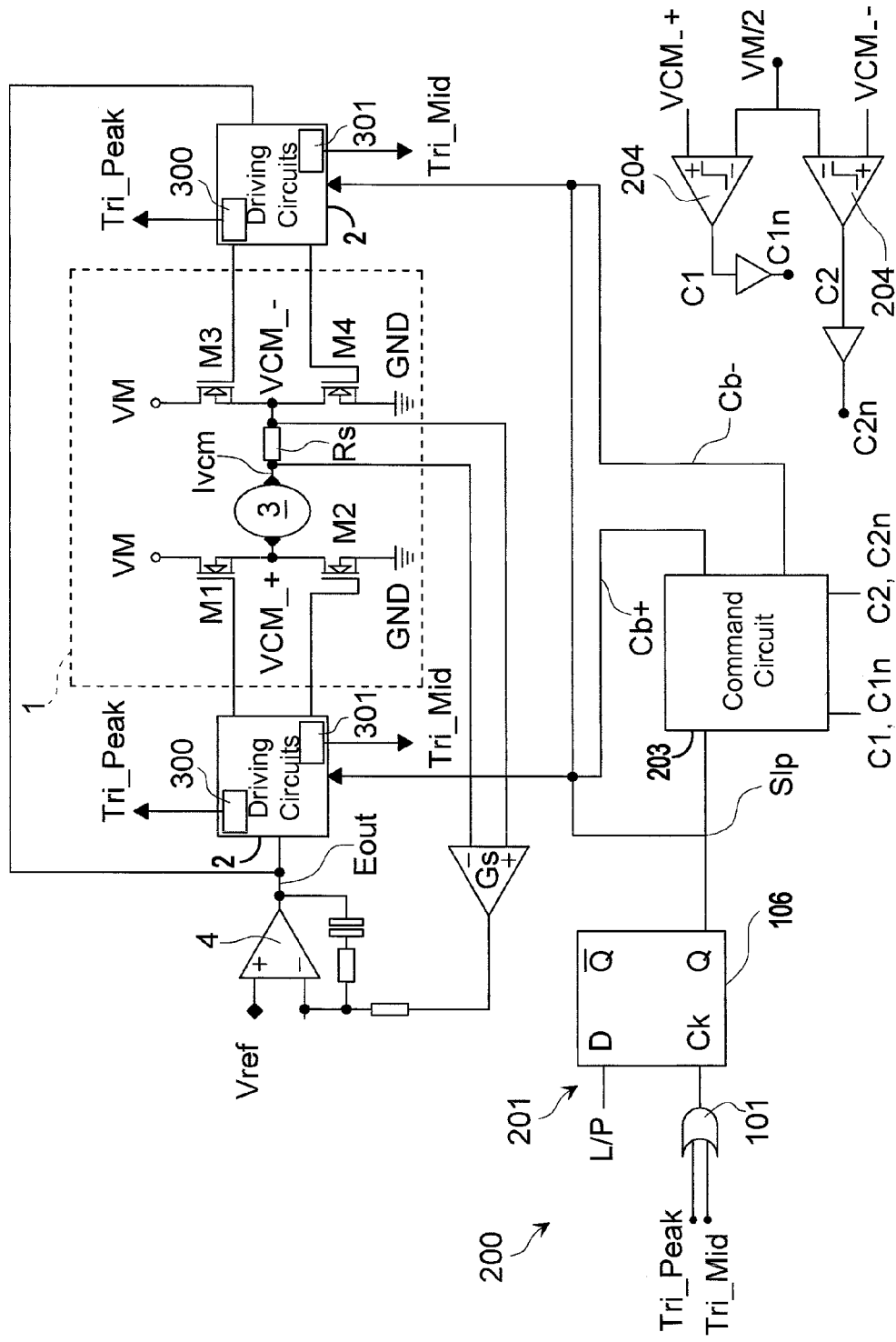
FIG. 10 shows the control device for the change of the driving mode of an electromagnetic load in accordance with one aspect of the present disclosure.

FIG. 10 shows a control device 200 for the change of the driving mode of an electromagnetic load 3 in accordance with a further aspect of the present disclosure.

The device 200 includes a first device 201 having an input command signal L/P for the change of the operating mode of an electromagnetic load 3 crossed by a current Ivcm from a first operating mode, i.e., the pulse width modulation operating mode or PWM mode, to a second operating mode, e.g., the linear operating mode, and a signal Tri_Peak, Tri_Mid representative of the flow of current Ivcm circulating within the load 3 at substantially its average value IM. The electromagnetic load 3 is driven by a plurality of switching circuits, preferably two half-bridges M1-M2, M3-M4; the central points of the two half-bridges are coupled to the ends of the electromagnetic load 3 and, during the first operating mode, each central point is subject to voltage variations ranging from a reference voltage, preferably the ground GND, to the supply voltage Vm. The control device 200 acts on the load by the two half-bridges M1-M2, M3-M4. The device 201 includes the circuit 106 or D flip-flop, adapted to synchronize the command signal L/P of the change from the first operating mode to the second operating mode of the electromagnetic load with the signal representative of the flow of current Ivcm circulating within the load 3 at substantially its average value IM. The device 200 is adapted to generate a command signal Slp as a function of the synchronization.

The synchronization occurs with the flow of current Ivcm at the average value IM of the current circulating on the electromagnetic load which, if the electromagnetic load is the voice coil motor 3 in FIG. 1 and the driving apparatus is that in FIG. 1, the flow of current Ivcm at the average value IM coincides with the peak (positive or negative) or the average value of the triangular voltage used for generating the signals PWM VCM_+ and VCM_−; therefore, the Tri_Peak or Tri_Mid signal is at the input of device 200.

In particular, the device 200 in accordance with the disclosure may be applied to the control apparatus of a voice coil motor 3 such as that in FIG. 1, already described and known from patent EP 760552, thus obtaining the control apparatus in FIG. 10; in such a case, the device 200 allows the change of the operating mode from PWM to linear LIN to be synchronized. The mode change command L/P and the signal $Tri_{13}$ Peak or $Tri_{13}$ Mid, i.e., the pulse signal representing the peaks of the triangular waveform Tri or Tri180, the latter being out of phase by 180° with respect to the triangular waveform Tri, or the pulse signal representing the average value of the triangular waveform Tri or Tri180 are at the input of the device 200; the signals $Tri_{13}$ Peak and $Tri_{13}$ Mid are detected by appropriate circuits 300 and 301 within the driving circuits 2 or outside them but still belonging to the control apparatus and already known. The output of the device 200 is a signal Slp that synchronizes the signal L/P with the peak or the average value of the triangular waveform Tri or Tri180. There is thus a synchronization with the PWM voltage frequency upon which the power stage 1 is working More particularly, circuit 301 detects the signal Tri_Mid at each crossing of the triangular waveforms Tri and Tri180.

Indeed, during the operation in PWM mode, the current Ivcm has a ripple superimposed to the average value: the current Ivcm of the voice coil motor 3 crosses the average value IM at half the conduction step, when the two outputs VCM_+ and VCM_− have a different potential, and at half the recirculation step, when the two outputs VCM_+ and VCM_− have the same potential (low or high).

These two time instants coincide with the peaks of the triangular waveforms and with the crossing between the two triangular waveforms Tri and Tri180, used for generating the PWM signals VCM_+ and VCM_−0 by the comparison with the output Eout of the error amplifier 4.

Two pulse signals, Tri_Peak and Tri_Mid, are present within the control apparatus and they indicate with precision the passage of the triangular waveforms out of phase by 180° in these two points.

Therefore, the change from PWM mode to LIN linear mode may be synchronized by means of the device 201, synchronously to the PWM frequency at which the power stage 1 is working.

The first drive 201 is adapted to command the driving of the electromagnetic load 3 with the first PWM operating mode in response to the synchronization still by the signal Slp and another circuit 203 is adapted to command the change from the first PWM operating mode to the second operating mode, e.g., LIN linear mode, of the electromagnetic load 3 by the signals Cb+ and Cb−, when at least one of the voltages VCM_+ and $VCM_{13}$ − reaches a value which is substantially equal to half the difference between the supply voltage Vm and a reference voltage, preferably the ground GND. The value VM/2 of voltages VCM_+ and VCM_− is detected by appropriate means, e.g., two comparators 204 having the voltages VCM_+ and VCM_− at the input on the inverting terminal and the voltage VM/2 at the input on the non-inverting terminal, respectively; the outputs C1 and C2 of comparators 204 are at the input of the circuit 203 that generates the signals Cb+ and Cb− with high outputs C1 and C2, i.e., when the voltages VCM_+ and VCM_+ have a value that is substantially equal to VM/2. In particular, when one of the outputs C1, C2 is high, the circuit 203 generates the signal Cb+ or Cb−, which acts on one of the two driving circuits 2 that drives one of the two half-bridges M1, M2 and M3, M4, thus imposing the linear operation. If output C2 is high, for example, the circuit 203 generates the signal Cb− which, by means of the driving circuit 2, imposes the linear operation to the half-bridge M3, M4; then, after a few nanoseconds, the output C1 will also be high and the circuit 203 generates the signal Cb+ which, by means of the driving circuit 2, imposes the linear operation to the half-bridge Ml, M2. Thereby, the two driving circuits 2 are commanded for changing the operating mode from PWM mode to the linear mode in a non-simultaneous manner, with the advantage of performing the transition for both the half-bridges M1, M2 and M3, M4 only when the output of the half-bridge is dynamic for an half (when the voltage VCM_+ or VCM_− reaches the voltage VM/2), i.e., under the better conditions for the transition, thus avoiding possible "spikes".

During the pulse width modulation operating mode or PWM mode, two of the gate terminals of transistors M1-M4 are ground GND-commanded and two are commanded about the supply voltage VM. During the output transition, i.e., during the step in which the voltage on the central point of each half-bridge M1-M2, M3-M4 is to transit from the supply voltage VM to the ground GND, or vice versa, the transistors M1-M4 of the half-bridges are driven by drivers 2, some of these drivers being grounded and some at a voltage close to the threshold voltage Vt. Namely, the gate terminals of transistors M1 and M3 are commanded at a voltage close to the threshold voltage Vt, whereas the gate terminal of transistors M2 and M4 are ground GND-commanded. In such a case, the voltage VCM+, VCM− on the central points of the half-bridges M1-M2 and M3-M4 takes a value which is equal to VM/2.

The first device 201 may be implemented with a flip-flop 100 as previously described. The asynchronous command L/P that defines the operating mode is sent to the input D of the flip-flop; the clock Ck of this flip-flop is represented by the output signal from a gate OR 101 having the two input signals Tri_Peak and Tri_Mid being synchronous with the peaks of the triangular waveforms and with the crossing thereof or the average value thereof. The flip-flop 106 has two outputs Q and Q-denied, with the output Q coinciding with the output Slp.

In particular, when the signal L/P is at the high level, the PWM mode is selected; whereas, when it is at the low level, the linear mode is selected, or vice versa.

Thereby, the output of the flip-flop 106 generates a signal Slp, which drives the transition of the operating mode from PWM to linear in the instants when the current ripple of the voice coil motor 3 is close to the average value of the controlled current.

Figure 11:
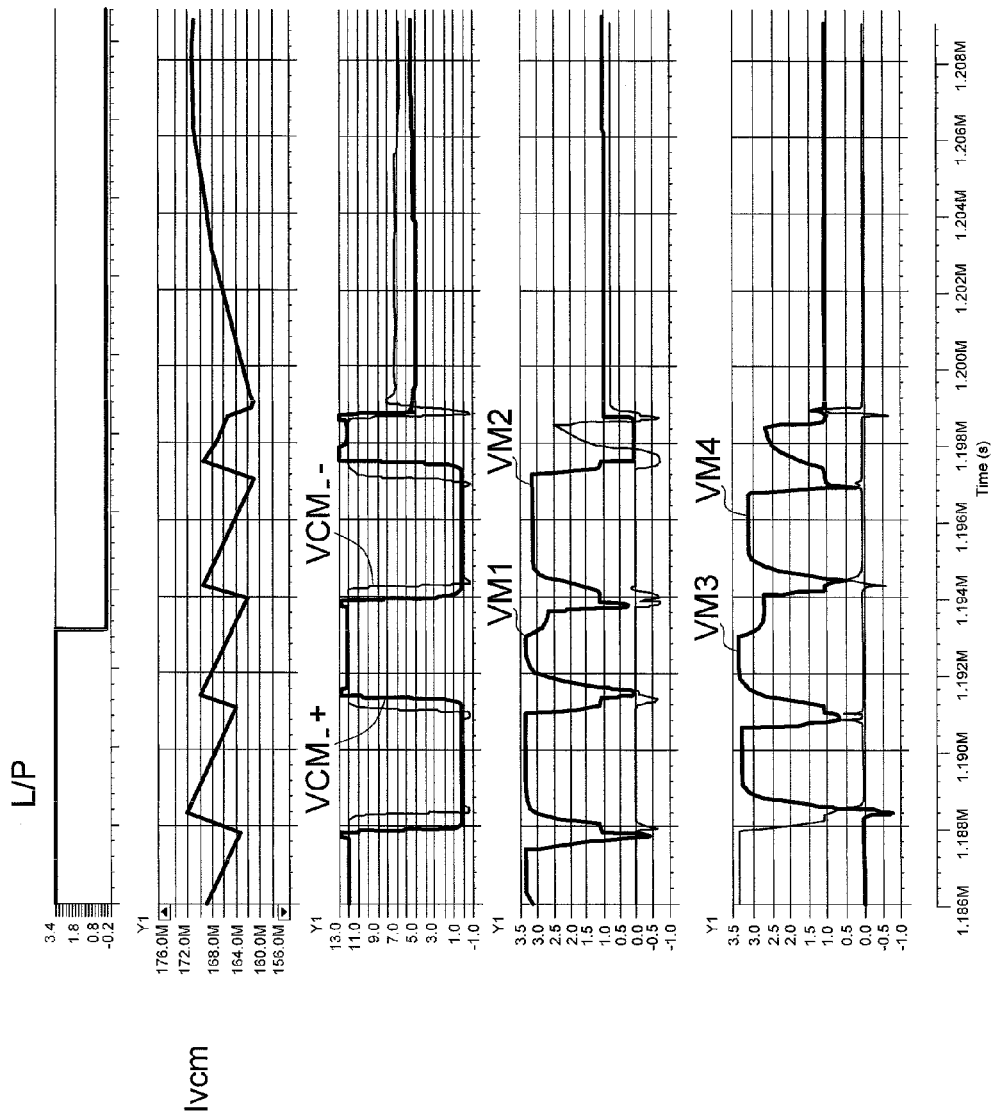
FIG. 11 shows time diagrams of signals involved in a control apparatus of a voice coil motor in which the device in accordance with the disclosure was added.

FIG. 11 shows the time diagrams of signals involved in the control apparatus of the voice coil motor 3 in FIG. 10. FIG. 11 shows the time diagrams of signal L/P, voltages VCM_+, VCM_− and current Ivcm.

The asynchronous command L/P exactly occurs when the ripple of current Ivcm is at its minimum level at the end of a recirculation step with both the two outputs VCM_+ and VCM_− being at the high level.

If the asynchronous command L/P occurs in any other instant during the ripple period of current Ivcm, the generation of the signal Slp would still occur in a synchronous manner to the passage of the ripple of current Ivcm at the average value IM at half a conduction step or at half a recirculation step, depending on which of these two steps occurs as first, after the signal L/P has changed its status (from high to low).

In FIG. 11 the patterns of the signals VM1-VM4 are shown, i.e., the voltages between the gate and source terminals of the respective transistors M1-M4; the PWM modulation is found after the generation of the signal L/P and the change from the PWM to the linear mode, when one of the voltages VCM_+ and VCM_− reaches a value which is substantially equal to VM/2.

Figure 12:
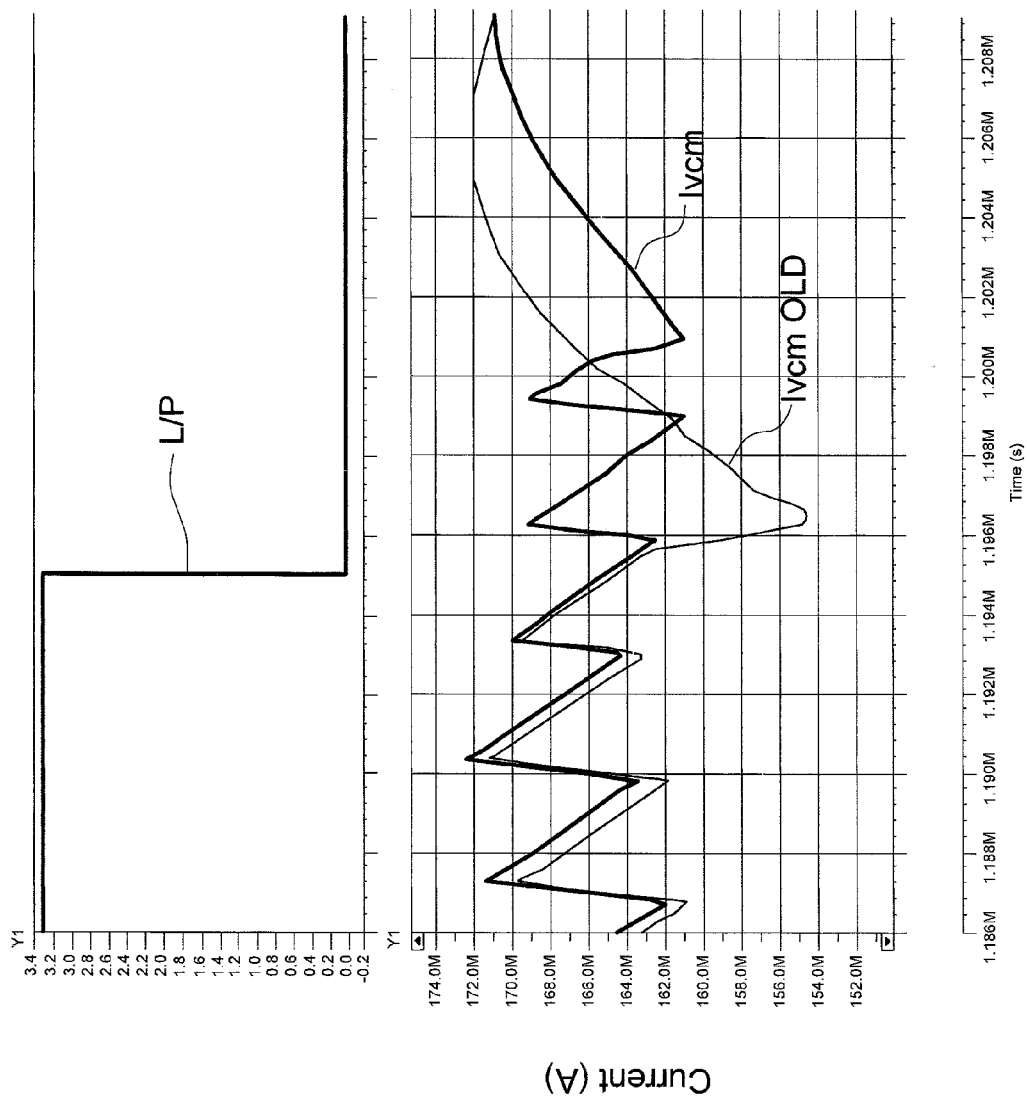
FIG. 12 shows time diagrams of external signal L/P, of the current which crosses the electromagnetic load in a control apparatus of a voice coil motor in which the device in accordance with the disclosure was added, and of the current which crosses the electromagnetic load in a known apparatus.

FIG. 12 shows the time diagrams of the signal L/P of current Ivcm and current Ivcmold of a known apparatus, such as that in FIG. 1. It should be noted that the discontinuity on the value of the controlled current Ivcm is limited and there are no glitches, as for current Ivcmold.

Thereby, the interference caused by changing the current control mode, which is of low entity, minimally disturbs the servo-control system which places the heads on the disk tracks and which is moved by the voice coil motor 3.

Figure 13:
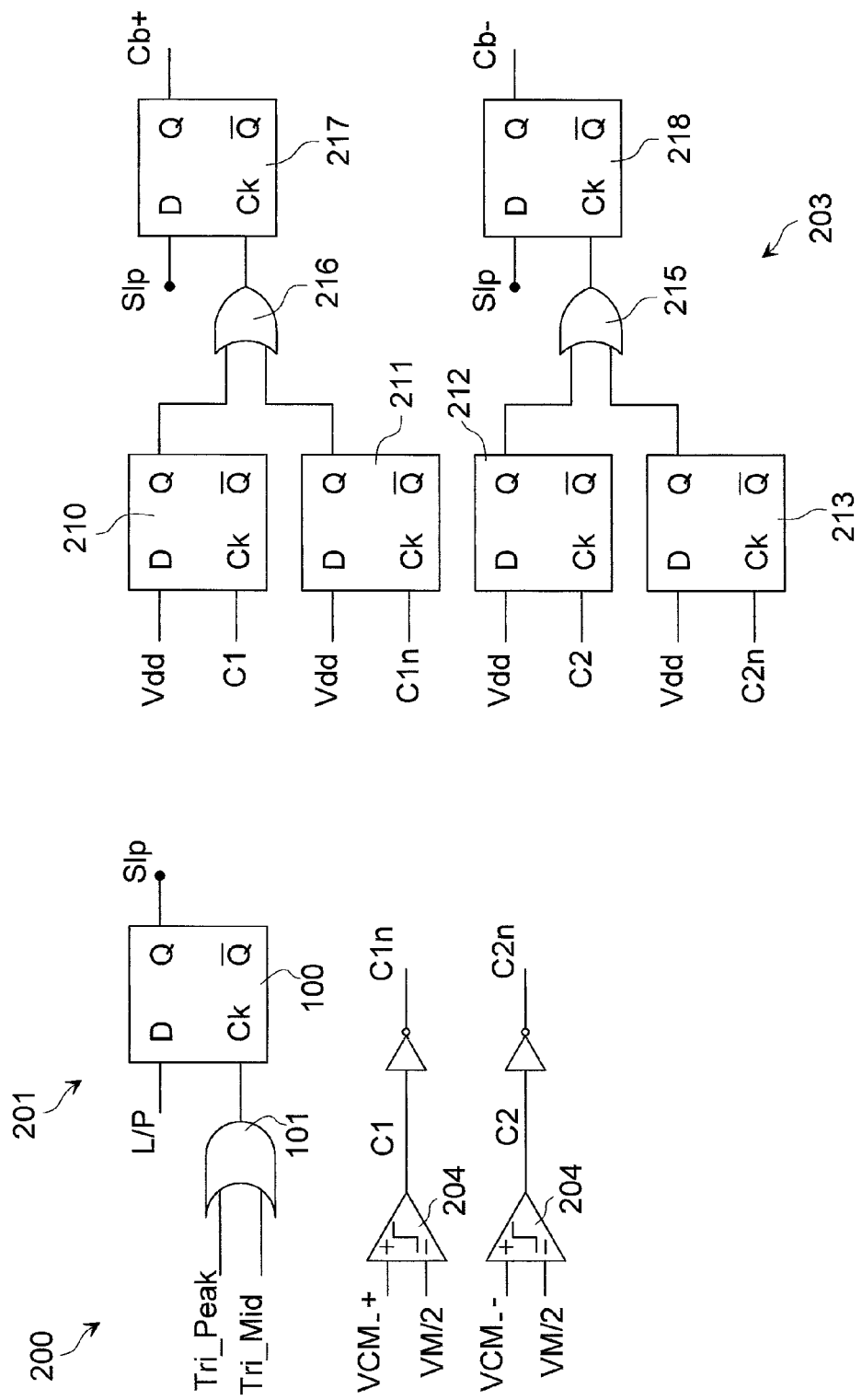
FIG. 13 shows a possible embodiment of part of the control device of FIG. 10.

An embodiment of the circuit 203 is shown in FIG. 13. The circuit 203 includes four flip-flops 210-213 having the supply voltage Vdd at the input terminal D and the signals C1, C1$n$, C2 and C2$n$, respectively, where C1$n$ and C2$n$ are the signals C1 and C2 denied, at the terminals CK. The outputs Q of flip-flops 210 and 211 are at the input of a gate OR 216, whereas the outputs Q of flip-flops 212 and 213 are at the input of a gate OR 215; the output of gate OR 216 is the input CK of another flip-flop 217 having the signal Slp at the input terminal D, whereas the output of gate OR 215 is the input CK of another flip-flop 218 having the signal Slp at the input terminal D. The output Q of flip-flop 217 is the signal Cb+ and the output Q of flip-flop 218 is the signal Cb−.

Therefore, when the output C1 is high, the flip-flop 210 enables the flip-flop 217 to send the signal Cb+ for changing the driving mode from PWM to linear mode to the driving circuit 2 of the half-bridge M1, M2.

Using flip-flops 210-213 and flip-flops 217-218 enables storing the information of occurred flow at the dynamic half, i.e., at the voltage VM/2, for each single half-bridge M1, M2 and M3, M4.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device to synchronize changing an operation modality of a driving circuit, the device comprising:

a first input configured to receive a first control signal that is configured to change the operation modality from a first operation modality to a second operation modality or vice versa;

a second input configured to receive a pulse signal representative of intersection points at which a current through a load equals an average value of the current through the load; and a synchronizer circuit configured to synchronize the first control signal with the pulse signal and to generate a second control signal as a function of the synchronization, the synchronizer circuit including:

a first input terminal coupled to the first input and configured to receive the first control signal, and a second input terminal coupled to the second input and configured to receive the pulse signal and an output terminal configured to output the second control signal as a function of the synchronization of the first control signal and the pulse signal.

2. The device according to claim 1 wherein the synchronizer circuit includes a flip-flop having a first input coupled to the first input of the device and configured to receive the first control signal and a second input configured to receive the pulse signal as a clock signal, the flip-flop configured to generate the second control signal as a function of the first control signal and the clock signal.

3. The device according to claim 1 wherein the first operation modality is a pulse width modulation (PWM) modality and the second operation modality is a linear mode and the pulse signal is representative of a positive or negative peak value of a triangular wave signal used for the PWM modality.

4. The device according to claim 1 wherein the first operation modality is a pulse width modulation (PWM) modality and the pulse signal is representative of an average value of a triangular wave signal used for the PWM modality.

5. The device according to claim 1 wherein the first operation modality is a pulse width modulation (PWM) modality and the pulse signal is representative of a crossing of a first triangular wave signal and of a second triangular wave signal that is 180° phase shifted with respect of the first triangular wave signal that are used for the PWM modality.

6. The device according to claim 1, further comprising an OR gate having a first input configured to receive the first signal and a second input configured to receive the second signal, and an output on which is generated the pulse signal to the synchronizer circuit.

7. A control apparatus for controlling an electromagnetic load, the apparatus comprising:

a driving circuit configured to drive the electromagnetic load and change an operation modality of driving the electromagnetic load from a first operation modality to a second operation modality or vice versa; and a device configured to synchronize the change of the operation modality of driving the electromagnetic load, the device including:

a synchronizer circuit configured to synchronize a first control signal, which is configured to change the operation modality from a first operation modality to a second operation modality and vice versa, with a selected one of first and second load current signals and to generate a second control signal as a function of the synchronization, the synchronizer circuit including:

a flip-flop having a first input terminal configured to receive the first control signal, and a second input terminal; and a logic gate having an output terminal, which is coupled to the second input terminal of the flip-flop, and first and second load current input terminals configured to receive respectively the first load current signal, which representative of an average value of the current through the load, and the second load current signal, which is representative of a positive or negative peak value of the current through the load, and to output on the output terminal one or the other of the first load current signal and the second load current signal as a pulse signal that is configured as a clock signal for the flip-flop, the flip-flop configured to generate the second control signal as a function of the first control signal and the clock signal.

8. The apparatus according to claim 7 wherein the first operation modality is a pulse width modulation (PWM) modality and the second operation modality is a linear modality, and the driving circuit includes a circuit configured to detect the current through the load and to generate a PWM signal as a function of a triangular wave signal associated with the PWM modality and an error signal representative of a difference between the detected current and an external signal.

9. The apparatus according to claim 8, comprising:

a power stage configured to be driven by the driving circuit and configured to drive a voice coil motor as the electromagnetic load, the power stage including a bridge circuit having two transistor half-bridges, the half bridges having respective output terminals configured to be electrically coupled to the voice coil motor, the driving circuit being configured to:

produce a first PWM signal by comparing a first triangular wave with an error signal representative of a difference between the detected current through the load and an external signal, produce a second PWM signal by comparing a second triangular wave of opposite phase with respect to the first triangular way with the error signal; and supply the voice coil motor with the first and second PWM signals.

10. A circuit, comprising:

first and second switching circuits, each having a respective output terminal;

an electromagnetic device having two input terminals respectively coupled to the output terminals of the first and second switching circuits, the electromagnetic device being configured to operate in a pulse width modulation mode and in a linear mode, the electromagnetic device being configured to conduct a current, each of the two outputs having a voltage value ranging from a first reference voltage to a second reference voltage, with the second reference voltage being higher than the first reference voltage; and a driving device configured to change the electromagnetic device from the PWM mode to the linear mode and from the linear mode to the PWM mode, the driving device having:

a first circuit including:

a first input configured to receive a first control signal that is configured to indicate a change from the linear mode to the PWM mode and vice versa, a second input configured to receive a pulse signal representative of intersection points at which a current through the electromagnetic device equals an average value of the current through the electromagnetic device, and a synchronizer circuit configured to synchronize the first control signal with the pulse signal and generate a second control signal as a function of the synchronization; and a second circuit configured to generate a third control signal to change the electromagnetic device to the linear mode when a voltage upon the output of the first switching circuit reaches a value that is substantially equal to half of a difference between the second reference voltage and the first reference voltage.

11. The circuit of claim 10 wherein the second circuit is configured to generate a fourth control signal to change the electromagnetic device from the PWM mode to the linear mode when the voltage on the output terminal of the second switching circuit also reaches a value that is substantially equal to half the difference between the second reference voltage and the first reference voltage.

12. The circuit of claim 10 wherein the synchronizer circuit comprises a flip-flop having a first input coupled to the first input of the device and configured to receive the first control signal and a second input configured to receive the pulse signal as a clock signal, the flip-flop being configured to generate the second control signal as a function of the first control signal and the clock signal.

13. The circuit of claim 10 wherein the pulse signal is a signal representative of a positive or negative peak value of at least one triangular waveform signal used for the PWM mode.

14. The circuit of claim 10 wherein the pulse signal is a signal representative of an average value of at least one triangular waveform signal used for the PWM mode.

15. The circuit of claim 10 wherein the pulse signal is a signal representative of a crossing of a first triangular waveform signal and a second triangular waveform signal, which is out of phase by 180° with respect to the first triangular waveform signal, used for the PWM mode.

16. The circuit of claim 10 wherein the second circuit comprises a further circuit configured to detect when the voltage upon either one of the two outputs of the first and second switching circuits reaches a value that is substantially equal to half the difference between the second reference voltage and the first reference voltage.

17. The circuit of claim 16 wherein the further circuit includes first and second comparators, each having a respective output terminal and inverted output terminal, and the second circuit includes first and second flip-flops, and wherein the first flip-flop has an input terminal coupled to an output terminals of the first comparator and the second flip-flop has an input terminal coupled to the inverted output terminal of the first comparator, the second circuit further including third and fourth flip-flops, the third flip-flop having an input terminal coupled to the output terminal of the second comparator and the fourth flip-flop having an input coupled to the inverted output terminal of the second comparator, the first and second flip-flops having respective output terminals coupled to a first OR gate and the third and fourth flip-flops having respective output terminals coupled to a second OR gate, the two OR gates having output terminals, the further circuit including fifth and sixth flip-flops, each having a first input terminal coupled to a respective output of the first and second OR gates and further having a second input terminal configured to receive the first input command signal and further configured to generate, respectively, the second and third output command signals.

18. A system, comprising:
an electromagnetic device;
a control apparatus configured to control the electromagnetic device and including:

a driving circuit configured to receive a command signal and to change an operating mode of the electromagnetic device from a first mode to a second mode in response to the command signal;
a device configured to generate the command signal, the device including:
a first input configured to receive a control signal that is configured to change the operation modality from a first operation modality to a second operation modality or vice versa;
a second input configured to receive a pulse signal representative of intersection points at which a current through the load equals an average value of the current through the load; and
a synchronizer circuit configured to synchronize the control signal with the pulse signal and to generate the command signal as a function of the synchronization, the synchronizer circuit including a first input terminal coupled to the first input and configured to receive the first control signal, and a second input terminal coupled to the second input and configured to receive the pulse signal and an output terminal configured to output the command signal as a function of the synchronization of the first control signal and the pulse signal.

19. The system according to claim 18 wherein the electromagnetic device is a voice coil motor, the first operating mode is a PWM mode and the second operating mode is the linear mode, the driving circuit including a detection circuit configured to detect current within the voice coil motor and to generate at least a PWM signal as a function of a triangular waveform signal and an error signal, the error signal representative of a difference between the detected current and an external signal.

20. A method, comprising:
controlling a change of driving mode of an electromagnetic load from a first operating mode with pulse width modulation to a second operating mode using a plurality of switching circuits; and
driving a current through the electromagnetic load using the switching circuits, the driving including, during the first operating mode, providing respective outputs of the switching circuits with a voltage value ranging from a first reference voltage to a second reference voltage, with the second reference voltage being higher than the first reference voltage, wherein:
the controlling includes:
synchronizing a first control signal, indicating a change of operating mode of the electromagnetic load from the first operating mode to the second operating mode, and a signal representative of the current through the load at substantially an average value of the current through the load and generating a second control signal as a function of the synchronization, and
commanding the change from the first operating mode to the second operating mode of the electromagnetic load in response to detecting that at least one voltage on either one of the two outputs of the two switching circuits reaches a value that is substantially equal to half the difference between the second reference voltage and the first reference voltage; and
the driving includes driving the load by the first operating mode in response to the second control signal.

21. The system of claim 20, further comprising:
at least one power stage configured to be driven by the driving circuit and coupled to the voice coil motor, the power stage including a bridge circuit having two half-bridges of transistors, the half-bridges having two respective output terminals coupled to the voice coil motor the two half-bridges configured to supply the voice coil motor with two PWM signals.

22. The system of claim 21, wherein the detection circuit is configured to generate the PWM signal in response to detection of a first triangular waveform signal and a second triangular waveform signal that is out of phase by 180° with respect to the first triangular waveform signal, and an error signal representative of a difference between the detected current and an external signal.

23. The method of claim 20, wherein the controlling further includes synchronizing the first control signal with a signal representative of a positive or negative peak value of current through the load and generating the second control signal as a function of the synchronization.

24. The method of claim 20, wherein the controlling further includes synchronizing the first control signal and a signal representative of a crossing of a first triangular wave signal of a second triangular wave signal that is 180° phase shifted with respect to the first triangular wave signal and generating the second control signal as a function of the synchronization.

25. A device to synchronize changing an operation modality of a driving circuit, the device comprising:
  a synchronizer circuit configured to synchronize a first control signal, which is configured to change the operation modality from a first operation modality to a second operation modality and vice versa, with a selected one of first and second load current signals and to generate a second control signal as a function of the synchronization, the synchronizer circuit including:
    a flip-flop having a first input terminal configured to receive the first control signal, and a second input terminal; and
    a logic gate having an output terminal, which is coupled to the second input terminal of the flip-flop, and first and second load current input terminals configured to receive respectively the first load current signal, which representative of an average value of the current through the load, and the second load current signal, which is representative of a positive or negative peak value of the current through the load, and to output on the output terminal one or the other of the first load current signal and the second load current signal as a pulse signal that is configured as a clock signal for the flip-flop, the flip-flop configured to generate the second control signal as a function of the first control signal and the clock signal.

26. The device according to claim 25 wherein the first operation modality is a pulse width modulation (PWM) modality and the second operation modality is a linear mode and the pulse signal is the second load current signal, which is representative of a positive or negative peak value of a triangular wave signal used for the PWM modality.

27. The device according to claim 25 wherein the first operation modality is a pulse width modulation (PWM) modality and the pulse signal is the first load current signal, which is representative of an average value of a triangular wave signal used for the PWM modality.

28. The device according to claim 25 wherein the first operation modality is a pulse width modulation (PWM) modality and the pulse signal is the second load current signal, which is representative of a crossing of a first triangular wave signal and of a second triangular wave signal that is 180° phase shifted with respect of the first triangular wave signal that are used for the PWM modality.

29. The device according to claim 25, wherein the logic gate is an OR gate having a first input configured to receive the first signal and a second input configured to receive the second signal, and an output on which is generated the pulse signal.

* * * * *